Feb. 10, 1970   KLAUS ROSE ET AL   3,494,466
FILTER
Filed April 24, 1968

INVENTORS
Klaus ROSE, Hans SCHACHT
Dieter VOGT, Fritz CUß
Eberhard WIEDENHÖFER
Heinz LÄMMERMANN
BY
Michael S. Striker
his their ATTORNEY

United States Patent Office 3,494,466
Patented Feb. 10, 1970

3,494,466
FILTER
Klaus Rose, Mundelsheim, Hans Schacht, Stuttgart, Dieter Vogt, Stuttgart-Weilimdof, Eberhard Wiedenhofer, Goppingen, Fritz Cub, Schwabach, and Heinz Lammermann, Nuremberg, Germany, assignors to Robert Bosch G.m.b.H., Stuttgart, Germany
Filed Apr. 24, 1968, Ser. No. 723,674
Claims priority, application Germany, May 9, 1967,
B 92,421
Int. Cl. B01d 27/06
U.S. Cl. 210—232         12 Claims

ABSTRACT OF THE DISCLOSURE

A fuel filter for use in combustion engines includes a housing consisting of two substantially cup-shaped sections rigid with one another and defining an internal cavity. Fluid inlet means is provided at one and fluid outlet means are provided at the other end wall of the housing. A filter insert consisting of a block-shaped member of accordion-pleated filter paper, the open sides of the folds of which are sealed, is received in the cavity and sealingly connected circumferentially of the cavity to the inner surface bounding the cavity so that the fluid passing through the cavity is forced to pass through the filter insert.

BACKGROUND OF THE INVENTION

The present invention relates to filters in general and more particularly to fuel filters for use in combustion engines.

It is well known that the liquid fuel used in internal combustion engines frequently contains minute contaminants which, however, may impair the operation of the engine or result in damage to the latter, unless they are removed from the fuel. A variety of fuel filters for this specific purpose is therefore already well known in the art. However, they all suffer from various drawbacks, one of which is the fact that they are relatively complicated in their construction resulting in relatively high manufacturing and selling costs, while on the other hand, most of these filters permit passage of fuel therethrough in only one direction so that it is not possible to install the filter in any position other than a specific predetermined position.

It is therefore a general object of the present invention to provide an improved fuel filter.

A more particular object of the invention is to provide a fuel filter specifically for use with internal combustion engines which is simple in its construction and therefore inexpensive to manufacture and to sell.

A further object of this invention is to provide such a filter which, despite its simplicity and small expense, is highly reliable under all operating conditions.

SUMMARY OF THE INVENTION

In accordance with one feature of my invention, I provide a filter particularly a fuel filter for use in internal combustion engines, which includes a housing consisting of two substantially cup-shaped sections rigid with one another. These sections together define an internal cavity bounded by a circumferential wall and having two opposite end walls. A fluid inlet is provided in one of these end walls, and a fluid outlet is provided in the other of the end walls so that fluid which is to be filtered will flow in a predetermined direction through the cavity from the inlet to the outlet. A filter insert is received in the cavity and includes a block-shaped main body portion of accordion-pleated filter paper having two opposite open sides. This main body portion is arranged in the cavity with the pleats and the open sides thereof extending in the predetermined direction. A sealing portion extends along the open side and seals the same against the escape of fluid. Sealing means is provided which sealingly connects the filter insert with the inner circumferential surface bounding the cavity so that fluid which enters the cavity at the inlet is compelled to travel in the predetermined direction through the filter insert towards the outlet and cannot pass through the cavity around the filter insert.

It is clear that this construction can be utilized in any desired manner, that is it is immaterial at which inlet the fluid is introduced and at which inlet it is removed in filtered condition. Such a construction is particularly suitable in mass production methods of constructing these filters.

The novel features which are considered as characteristic for the invention are set forth in particular in the appended claims. The invention itself, however, both as to its construction and its method of operation, together with additional objects and advantages thereof, will be best understood from the following detailed description of specific embodiments when read in connection with the accompanying drawings.

DESCRIPTION OF THE PREFERRED EMBODIMENTS

Figure 1:
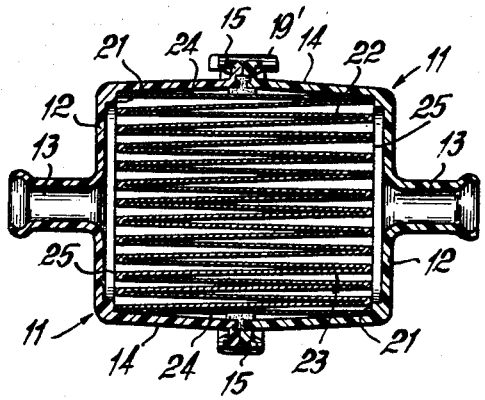
FIG. 1 is an axial section through a filter in accordance with the present invention.
Figure 2:
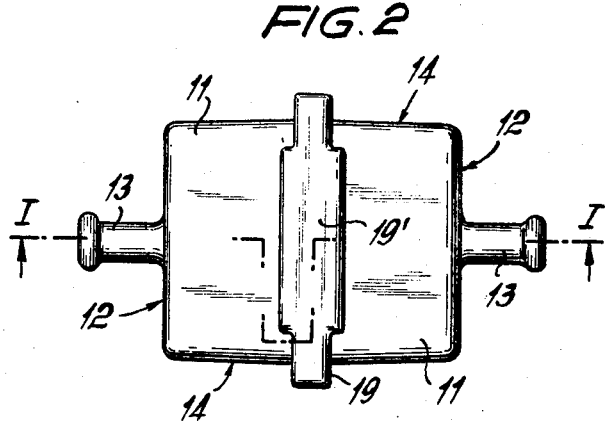
FIG. 2 is a top-plan view of the filter which is shown in section in FIG. 1.

Discussing now the drawing in detail it will be seen that in FIG. 1 the housing of the fuel filter there illustrated consists of two substantially identical cup-shaped portions 11. FIGS. 1 and 2 clearly illustrate that these portions are positioned mirror-symmetrically with reference to one another. Each of the portions 11 is provided in its bottom wall 12 with a conduit 13 which in the illustrated embodiment is arranged centrally although this is of course not absolutely necessary. The portion 14 of each of the housing portions 11 which is located adjacent the bottom wall 12 is of polygonal cross-section, in this case of quadratic cross-sectional configuration, and tapers slightly in conical manner outwardly in direction away from the bottom wall 12.

Each of the housing sections 11 is provided at its open end with a laterally projecting flange 15 and FIGS. 1 and 2 both clearly illustrate that the flanges 15 abut one another so that the two housing portions 11 together define an enclosed interior cavity.

Figure 3:
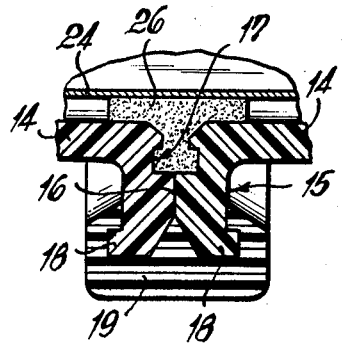
FIG. 3 is a sectional view, on an enlarged scale, illustrating a detail of the filter shown in FIGS. 1 and 2.

FIG. 3 shows in detail the configuration of the flanges and it will be seen that the two flanges 15 have abutting flange faces 16 which are so configurated that when the faces 16 abut against one another, there is provided an annular pocket 17 which is accessible only from the interior of the cavity. At their outer ends the flanges are undercut so as to provide projecting annular portions 18 which are engaged and surrounded by an annular member 19 which clamps them together. Advantageously, the member 19 which clamps them together. Advantageously, the member 19 is provided by injection-molding it about the flanges 15, and it will be seen that the housing portions 11 as well as the member 19 consist in the illustrated embodiment of synthetic plastic material, Advantageously, the member 19 will be provided on one side of the completed filter with a flat surface 19′ which may serve as a support for the type number and other pertinent information relating to the filter, such as the name of the manufacturer and the like.

At their interior both of the housing portions 11 are provided adjacent their respective bottom walls 12 with annular abutment shoulder 21 on which there rests a filter insert 22. The construction of the filter insert is shown clearly in FIG. 1, and it will be appreciated from this figure that the insert 22 consists of sheet-material, for example inpregnated filter paper which is accordion-pleated in block shape. Of course, whatever sheet material is used will have to be permeable to the fluid which is to be filtered. The accordion-pleating of the sheet material results in a substantially block-shaped insert the pleats of which are open laterally, that is at the sides 23 thereof. These sides 23 that is the open sides of the pleats which extend parallel to the direction of fluid flow through the cavity from one to the other of the conduits 13 are covered by suitable sealing elements 24. Advantageously these sealing elements are provided in form of foils of thermoplastic material which may be heat-sealed to the edges of the filter paper or other sheet material from which the filter insert 22 is folded. With this construction the insert 22 is provided on all its outer peripheral faces which extend parallel with the direction of fluid flow with closed smooth surfaces whereas its open ends 25 respectively face the fluid inlet and the fluid outlet, that is that side of the filter which faces the incoming unfiltered fluid and that side which faces the outlet through which the filtered fluid leaves the filter.

FIG. 1 shows that the insert 22 is supported at its opposite open ends on the abutment shoulders 21 of the respective housing portions 11. Furthermore, it is of course also supported by the peripheral wall of the housing in the region of these abutment shoulders 21, as clearly shown in FIG. 1, by virtue of the fact that the respective housing portions 11 taper in cross-sectional area in the direction towards their associated bottom walls 12.

Naturally, it is necessary that the filter insert 22 be suitably connected in sealing relationship with the wall of the housing to prevent fluid from bypassing around the filter insert. For this purpose there is provided a ring 26 of adhesive material which surrounds the filter insert 22 in the illustrated embodiment substantially in the plane of abutment of the two housing portions 11. FIG. 3 shows particularly clearly that this ring 26 not only adhesively engages the outer peripheral surfaces of the insert 22 but also extends into the annular pocket 17 so that it not only seals the incoming side of the filter, that is the side at which the fluid to be filtered enters, against the outgoing side but also serves as an additional seal against escape of fluid out of the housing between the abutment surfaces 16. Naturally, the ring 26 also prevents movement of the insert 22.

In assembling the construction which is shown by way of example in FIGS. 1–3, the insert 22 is surrounded by the ring 26 in the manner visible in FIG. 1. The ring, of course, adheres to the outer peripheral surfaces of the insert 22. Thereupon, the two housing portions 11 are placed over the insert 22 from opposite ends thereof and are pushed together until their faces 16 abut one another. Such movement effects squeezing of at least a portion of the ring 26 so that the thus displaced material of the ring 26 will flow into the annular pocket 17 as well as tightly closing the gap between the inner circumferential surface bounding the housing cavity and the outer peripheral surface of the insert 22. If there is any excess material of the ring 26 it will be squeezed out between the faces 16 before the same has moved into complete abutment and can then be moved over the exterior of the flanges 15. Thereupon, the member 19 is provided surrounding the flanges 15 by being injection molded thereabout in thermoplastic condition. As the synthetic plastic material from which the member 19 is constituted shrinks during cooling, it of course exerts a clamping pressure on the flanges 15 connecting them rigidly with one another. While actually, the ring 26 should suffice to seal the construction against the escape of fluid between the faces 16 to the exterior, it is clear that the presence of the member 19 constitutes an additional safety factor because this will of course completely prevent any possible escape of fluid.

The annular pocket 17 is provided to assure that sealing is effective between the housing constituted by the two sections 11 and the filter 22 even in case of elevated differential pressures. The adhesive material of the ring 26 does not adhere too well to the synthetic plastic material of the housing portions 11 so that it is conceivable that it might partially recede from engagement with these housing portions 11 and thus form "channels" through which unfiltered fluid may intrude into the pocket 17 from one side and filtered fluid from the other side of the ring 26. However, the manner in which the material of the ring 26 is squeezed into the pocket 17 in effect provides elaborant so that creeping of fluid from the one side to the other of the ring 26, and consequent admixture of filtered and unfiltered fluid or vice versa is prevented.

It will be appreciated that the housing sections 11 could, of course, also be made from a different material than synthetic plastic material as could the member 19. It will also be appreciated that the presence of the member 19 provides a very high mechanical rigidity and stability for the filter according to the present invention which makes this filter suitable even for applications in which it is subjected to considerable stresses.

It will be understood that each of the elements described above, or two or more together, may also find a useful application in other types of constructions, differing from the types described above.

While the invention has been illustrated and described as embodied in a fuel filter, for use in internal combustion engines, it is not intended to be limited to the details shown, since various modifications and structural changes may be made without departing in any way from the spirit of the present invention.

What is claimed as new and desired to be protected by Letters Patent is set forth in the appended claims:

1. A filter, particularly a fuel filter for use in internal combustion engines, comprising, in combination, a housing including two substantially cup-shaped sections abutting and rigid with one another and together defining an internal cavity bounded by an inner circumferential surface and two opposite end walls; fluid inlet means in one and fluid outlet means in the other of said end walls so that fluid to be filtered will flow in predetermined direction through said cavity from said inlet means to said outlet means; a filter insert received in said cavity, said filter insert including a block-shaped main body portion of accordion-pleated filter paper having two opposite open sides, said main body portion being arranged in said cavity with the pleats and said open sides thereof extending in said predetermined direction, and a sealing portion extending along said open sides and sealing the same against escape of fluid; and sealing means sealingly connecting said filter insert with said inner circumferential surface bounding said cavity so that fluid entering said cavity at said inlet means is compelled to travel in said predetermined direction towards said outlet means through said filter insert.

2. A filter as defined in claim 1, wherein said sealing means is a coherent ring of adhesive material.

3. A filter as defined in claim 1, wherein said sealing means surrounds said insert and engages said inner circumferential surface substantially in the plane of abutment of said cup-shaped sections so as to seal said abutting sections against escape of fluid from said cavity as well as to sealingly connect said insert with said inner circumferential surface.

4. A filter as defined in claim 1, wherein said sections comprise respective substantially radially outwardly extending flanges surrounding the open side of the respective cup-shaped section and abutting against one another; and clamping means surrounding said flanges and clampingly maintaining the same in abutment with one another.

5. A filter as defined in claim 4, wherein said clamping means comprises a clamping member of channel-shaped cross-section straddling said flanges and consisting of a hardenable material molded thereabout in flowable condition.

6. A filter as defined in claim 5, wherein said clamping member is provided on the circumference thereof with a flat face constituting a shield for affixing of indicia.

7. A filter as defined in claim 5, wherein said clamping member is an annular member.

8. A filter as defined in claim 4, wherein said flanges define with one another an annular channel surrounding said cavity outwardly of said inner circumferential surface and communicating only with said cavity, and wherein said ring of adhesive material extends into said channel at least substantially filling the same.

9. A filter as defined in claim 5, wherein said flanges are each provided at their respective outer abutting edge portions with a circumferential chamfer so as together constitute an outwardly open circumferential groove in the plane of abutment of said sections and wherein the material of said annular clamping member fills said groove and said clamping member thereby has a wall thickness which is greater in said plane of abutment.

10. A filter as defined in claim 1, wherein said sealing portion comprises foils of thermoplastic material heat-bounded to said insert at said open sides and sealing the latter.

11. A filter as defined in claim 1, wherein each of said sections is provided interiorly thereof and in the region of the respective end wall with an abutment shoulder against which said filter insert abuts with one end of said main body portion.

12. A filter as defined in claim 11, wherein each of said sections has an inner cross-section which converges in direction toward the respective end wall, and wherein said filter insert is out of engagement with the circumferential wall of the respective section remote from the associated end wall but engages said circumferential wall so as to be positioned and guided thereby in the region of said associated end wall.

References Cited

UNITED STATES PATENTS

| | | | |
|---|---|---|---|
| 2,995,254 | 8/1961 | Bennett | 210—494 X |
| 3,002,870 | 10/1961 | Belgarde et al. | 210—232 X |
| 3,037,637 | 6/1962 | Bub | 210—494 X |

FOREIGN PATENTS 878,851   10/1961   Great Britain.

JAMES L. DE CESARE, Primary Examiner

U.S. Cl. X.R.

210—446, 493